Oct. 3, 1961            L. RUESS          3,002,399
MOTOR WITH DRIVE FOR VEHICLES WITH PEDALS, ESPECIALLY
TWO-WHEELED VEHICLES

Filed July 21, 1958                          2 Sheets-Sheet 1

INVENTOR
LEOPOLD RUESS
Strauch, Nolan + Neale
ATTORNEYS

Oct. 3, 1961 L. RUESS 3,002,399
MOTOR WITH DRIVE FOR VEHICLES WITH PEDALS, ESPECIALLY
TWO-WHEELED VEHICLES
Filed July 21, 1958 2 Sheets-Sheet 2

INVENTOR
LEOPOLD RUESS

Strauch, Nolan + Neale
ATTORNEYS

3,002,399
MOTOR WITH DRIVE FOR VEHICLES WITH PEDALS, ESPECIALLY TWO-WHEELED VEHICLES

Leopold Ruess, 20 Egloffstrasse, Munich, Germany
Filed July 21, 1958, Ser. No. 749,775
Claims priority, application Germany July 23, 1957
10 Claims. (Cl. 74—625)

This invention relates to a motor with drive for vehicles with pedals, especially two-wheeled vehicles, wherein the pedal drive is usable as well for starting the motor which is an internal combustion engine as for pedalling on motor drive, and at which, for disengaging of the motor drive as well as of the pedal drive, there is provided a single clutch effectively arranged as well between the motor crankshaft and the driven shaft common for the two drives, as between the pedal crankshaft and the driven shaft.

On motorcycles of such type the pedal crankshaft and the motor crankshaft are steadily connected either non-positive or positive. There is one difficulty when starting the engine by the pedals by the fact that one is only able to exercise the full force when pedalling downwards. If, however, the pedal cranks are standing vertically, it is only possible to turn them forward out of their dead point positon by overcoming the engine compression, in order to get a positon favorable for starting which naturally is difficult. A backward turning of the pedal crankshaft is not possible because of the brake mounted on said shaft and operated by backward pedalling.

For avoiding this disadvantage and for enabling always a turning of the foot pedals in a position most favorable for starting the motor the invention proposes to provide a free-wheel clutch within the gearing between the pedal crankshaft and the motor-crankshaft, said free-wheel clutch being formed such as to permit a turning of the pedal crankshaft within the range of the upper and/or lower dead-point positions of the pedal cranks without simultaneous turning of the motor crankshaft. This turning shall reasonably be possible around an angle of about 30° from the vertical.

This free-wheel clutch arranged between pedal crankshaft and motor crankshaft is suitably formed as a pawl coupling the pawl of which has two arms, wherein one arm forms the coupling between the driving and the driven part of the free-wheel clutch, and which, in its movement, is controlled by the second arm sliding on a stationary curve.

For avoiding an idle running of the pedal cranks always in their upper and lower dead point when assisting the motor, the two arms of the pawl are formed of two separate parts between which a clutch is provided which, outside the upper and/or lower dead point positions of the pedal cranks, effects a positive connection between the driving and the driven part of the free-wheel clutch and which, within the range of the dead point positions, renders possible the disengagement of this connection. The two arms are pressed against the curve respectively into the pawl toothing by springs, at which the spring coordinated to the control arm is stronger than same coordinated to the clutch arm of the pawl. Moreover the pawl toothing of the free-wheel clutch is relieved. By this construction of the free-wheel clutch is effected that the pawl, when it was once put into coupling position by its control arm, it remains in that position as long as there is no more pressure put on the pedals, in which case the control arm because of its stronger spring can press the clutch arm within the dead point positions of the pedal cranks out of the pawl toothing.

The curve for the control arm of the pawl can be a pot-shaped or ring-shaped body fixed at the motor housing or formed out of same, at the interior wall of which body the control arm is sliding. Said interior wall is provided with bulges or recesses which in their size at least correspond to the wanted free angle of the pedal cranks. When the control arm falls into these bulges or recesses, the clutch arm of the pawl is pressed out of the pawl toothing when no pressure is effected onto the pedals.

Further details and characteristics of the invention can be seen from the following description in connection with the drawing representing an embodiment of the invention on principle.

Figure 2:
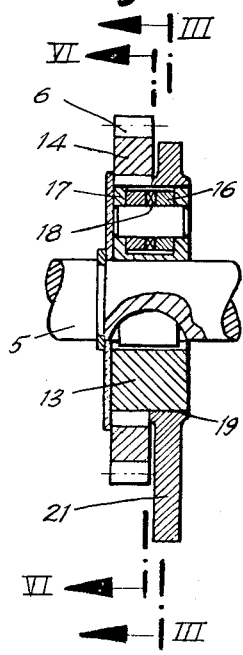
FIG. 2 shows the free-wheel clutch provided between pedal crank-shaft and motor crankshaft in longitudinal section.

On the driven shaft 1, there is non-rotatably mounted a clutch 2 which has a conical outer portion engageable with an inside frusto-conical clutch surface on a double gear wheel 3 which is also mounted on shaft 1. The toothing 4 of said wheel is in engagement with a toothed wheel 6 mounted on the pedal crankshaft 5, and the toothing 7 of which is in engagement with a toothed wheel 8 that is fixed upon an intermediate shaft 9 connected by way of a V-belt transmission 10 with the motor crankshaft 11. The free-wheel clutch which according to the invention is provided between the pedal crankshaft 5 and the toothed wheel 6, is explained in details in FIGS. 2 to 4.

Figure 3:
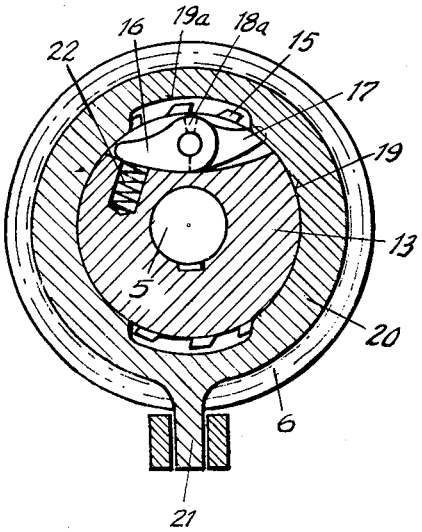
FIG. 3 shows the free-wheel clutch in cross-section according to line III—III in FIG. 2.
Figure 4:
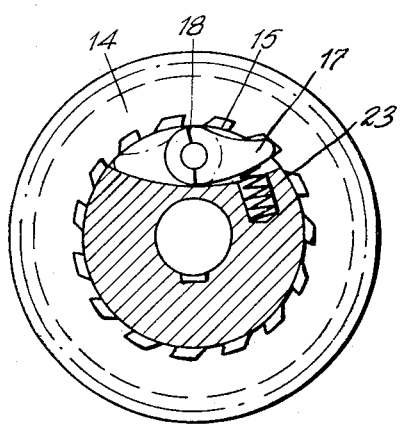
FIG. 4 shows the free-wheel clutch is cross-section according to line IV—IV in FIG. 2.

The free-wheel clutch 12 is formed as a pawl free-wheel and consists of an inner ring 13 fixed on the pedal crankshaft 5, and of an external ring 14, which on its external circumference is bearing the toothing 6 and which on its inner circumference is provided with a pawl toothing 15. In the inner ring 13 there are one or more ratchets rotatably supported, which ratchets consist of a control arm 16 and of a clutch arm 17. Said arms are not lying in the same plane and can be connected by a claw coupling 18. The free end of the control arm 16 is sliding on a curve which is formed by the wall 19 of a ring-like body 20. This body is for instance fixed on the engine crank case by a lug 21. The wall 19 is, as can be seen from FIG. 3, provided with bulges 19a on part of its circumference. The free end of the clutch arm 17 engages into the relieved pawl toothing 15. The control arm 16 is pressed by the spring 22, outside against the wall 19, the clutch arm 17 is pressed into the toothing 15 by the spring 23. The spring 22 is stronger than spring 23.

The operation of the invention is as follows: Within the range of the upper and/or lower dead point positions of the pedal cranks the control arm 16 of the pawl of the free-wheel clutch 12 gets free from the wall 19 of the ring body 20, and, by the spring 22, it is pressed out into the bulge 19a. If there is no pressure on the pedals and therefore the clutch arm 17 is not clamped in the pawl toothing 15, the clutch arm 17 can by aid of the claw coupling 18 be swung inside by the control arm 16 against the effect of the spring 23. It therefore comes out of engagement with the pawl toothing 15. Now the pedal crankshaft can be turned forward for a certain measure which is determined by the size of the bulges 19a of the wall 19, without effecting at the same time also a turning of the motor crankshaft. After having reached a favorable starting position of the pedals the control arm 16 runs on the wall 19, with the result that this arm against the effect of the spring 22 is pressed inwards and because of the free angle 18a of the claw coupling 18 the clutch arm 17, by its spring 23, may be pressed outward into the pawl toothing 15. Herewith the positive connection between the pedal crankshaft 5 respectively the inner ring 13 and the external ring 14 respectively the toothed wheel 6 is established, and the motor is turned with the turning of the pedal crankshaft. The engagement of the clutch arm 17 into the pawl toothing 15 remains as long as pressure is put on the pedals, as the clutch arm on account of the recessed formation of the toothing 15 cannot be put out of this toothing by itself, even if the control arm 16 is pressed out by the spring 22 when reaching the bulges 19a in the wall 19, because the force effected on the pedal is together with the force of the spring 23 in any case stronger than the force effected by the spring 22. Herewith the positive connection between the internal ring 13 and the external ring 14 of the free-wheel clutch 12 after the first engagement of the clutch arm 17 with the pawl toothing 15 is maintained until the pedals are unburdened, respectively until the ring 14 runs faster than the ring 13 which happens when the motor has started or when the vehicle is running so quickly that it cannot be driven in addition by the pedals. For this reason the wall 19 need not be provided for the whole range over which a positive connection shall exist, but only always at that point at which that positive connection shall begin, as it is automatically maintained when there is pressure upon the pedal, as explained above.

Figure 1:
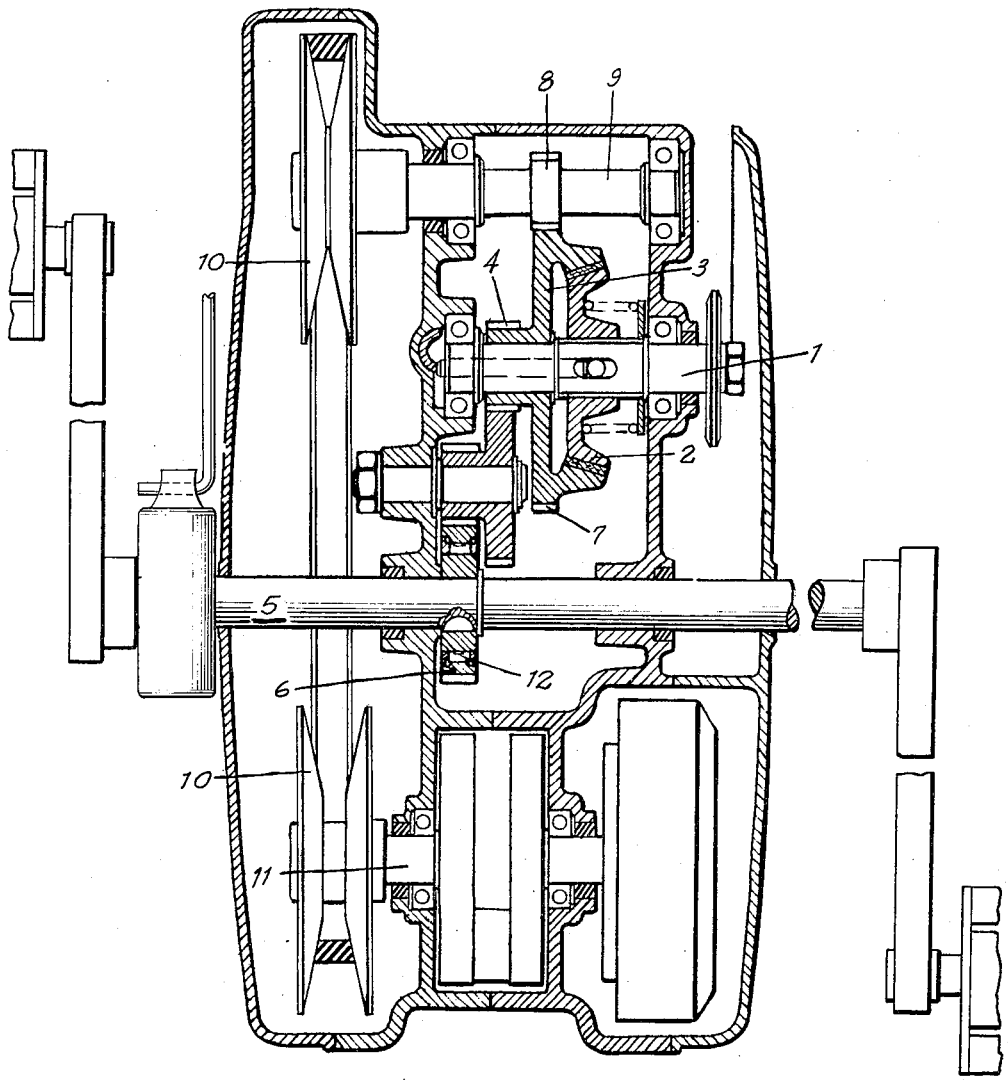
FIG. 1 shows the motor gearblock of a motorized bicycle in cross-section.

In the arrangement shown in FIG. 1 the free-wheel clutch 12 takes over the task of the usual over-running clutch for the prevention of the turning of the pedal crankshaft on motor drive. It is, however, possible to put the freewheel clutch described in FIGS. 2 to 4 on another place in the gearing between foot pedal shaft and motor crankshaft. Naturally one can also choose to leave the free-wheel clutch at the place shown in FIG. 1 and arrange a normal over-running clutch on another place.

Although a particular embodiment of the invention has been described in detail herein and shown in the accompanying drawing, it is to be understood that the invention is not limited to that particular embodiment, and that various changes and modifications may be effected therein without departing from the scope or spirit of the invention, except as defined in the appended claims.

What I claim is:
1. A vehicle drive, comprising: a motor crankshaft; a drive output shaft, and means interconnecting it with said motor crankshaft; a pedal drive usable both for starting the motor and for driving said output shaft to assist the motor; said pedal drive including a pedal crankshaft, adapted to have at least one pedal crank mounted thereon, with means for connecting said pedal crankshaft with said motor crankshaft in driving relation in one direction of rotation and for connecting said pedal crankshaft to said output shaft; said last means including a free wheeling clutch adapted to allow turning of said pedal crankshaft in the driving direction in the range of the upper and lower dead center positions of the pedal crank without simultaneously turning the motor crankshaft.

2. A vehicle drive as defined in claim 1, further comprising a single clutch means for disengaging both the motor drive and the pedal drive from said output shaft.

3. A vehicle drive as defined in claim 1, wherein said free-wheeling clutch comprises driving and driven parts with a pawl coupling therebetween including a first arm establishing connection between said driving and driven parts, a stationary curved member, and a second arm sliding on said stationary curved member and controlling movement of said first arm.

4. A vehicle drive as defined in claim 3, wherein said free-wheeling clutch comprises a lost motion coupling between both said second and first arms, adapted to effect positive connection between said driving and driven parts of said free-wheeling clutch through said first arm when the pedal crankshaft is angularly disposed so that a pedal crank thereon is a predetermined angle outside one of its dead center positions, said lost motion coupling being adapted to permit interruption of said positive connection when the pedal crank is within said predetermined angle from one of said dead center positions.

5. A vehicle drive as defined in claim 4, comprising teeth on said driven part of the free-wheeling clutch, with spring means for urging said second arm in engagement with said stationary curve and said first arm in engagement with said teeth, the spring of said second arm being stronger than the spring of said first arm, said teeth on the driven clutch part being relieved to permit free-wheeling in one direction.

6. A vehicle drive as defined in claim 3, including a motor and housing, wherein said stationary curved member is a ring-shaped body which is non-rotatably secured to the motor housing and has an inner cylindrical wall provided with at least one recess extending therefrom into the ring body to receive said second arm, said recess being of an arcuate length at least equal to said predetermined angle of free movement of the pedal crankshaft.

7. A vehicle drive as defined in claim 6, wherein the size of said recess corresponds to a free angle of the pedal crankshaft of about 30° forward from the vertical when the drive is installed on a vehicle.

8. A vehicle drive comprising: a motor crankshaft; an output drive shaft; first drive means operatively connecting said motor crankshaft and the output drive shaft; a pedal crankshaft adapted to have at least one pedal crank mounted thereon, and second drive means for operatively connecting said pedal crankshaft with said motor crankshaft and with said output shaft; said second drive means including at least a portion of said first drive means, a free-wheeling clutch means which permits the pedal crankshaft to turn in the driving direction without turning of the motor crankshaft when the pedal crankshaft is in a predetermined angular range with respect to its positions for upper and lower dead center position of a pedal crank mounted on said pedal crankshaft.

9. A vehicle drive as defined in claim 8, further comprising a single clutch means for disengaging said first drive means and said second drive means from said output shaft.

10. A vehicle drive as defined in claim 8, wherein: said clutch means is non-rotatably mounted on said output shaft; said first drive means includes a gear train with an intermediate gear mounted on said output shaft and engageable with said clutch; said second drive means comprises a second gear train including said intermediate gear; said free-wheeling clutch includes a driving member non-rotatably mounted on said pedal crankshaft, a driven member forming part of said second gear train and operatively connected to said intermediate gear, and coupling means providing a positive driving connection between said driving and driven members in one direction of rotation and a free-wheeling coupling in the other direction of rotation, with said driving connection disengaging when said pedal crankshaft is in said predetermined angular position forward of said dead center position corresponding with the vertical when said drive is mounted on a vehicle.

References Cited in the file of this patent

UNITED STATES PATENTS

| | | |
|---|---|---|
| 1,094,558 | Harley | Apr. 28, 1914 |
| 1,827,251 | Meyer | Oct. 13, 1931 |
| 1,830,004 | Skoverski | Nov. 3, 1931 |
| 2,726,747 | Kreidler | Dec. 13, 1955 |
| 2,760,385 | Fuchs | Aug. 28, 1956 |
| 2,841,990 | Hilber | July 8, 1958 |